United States Patent Office.

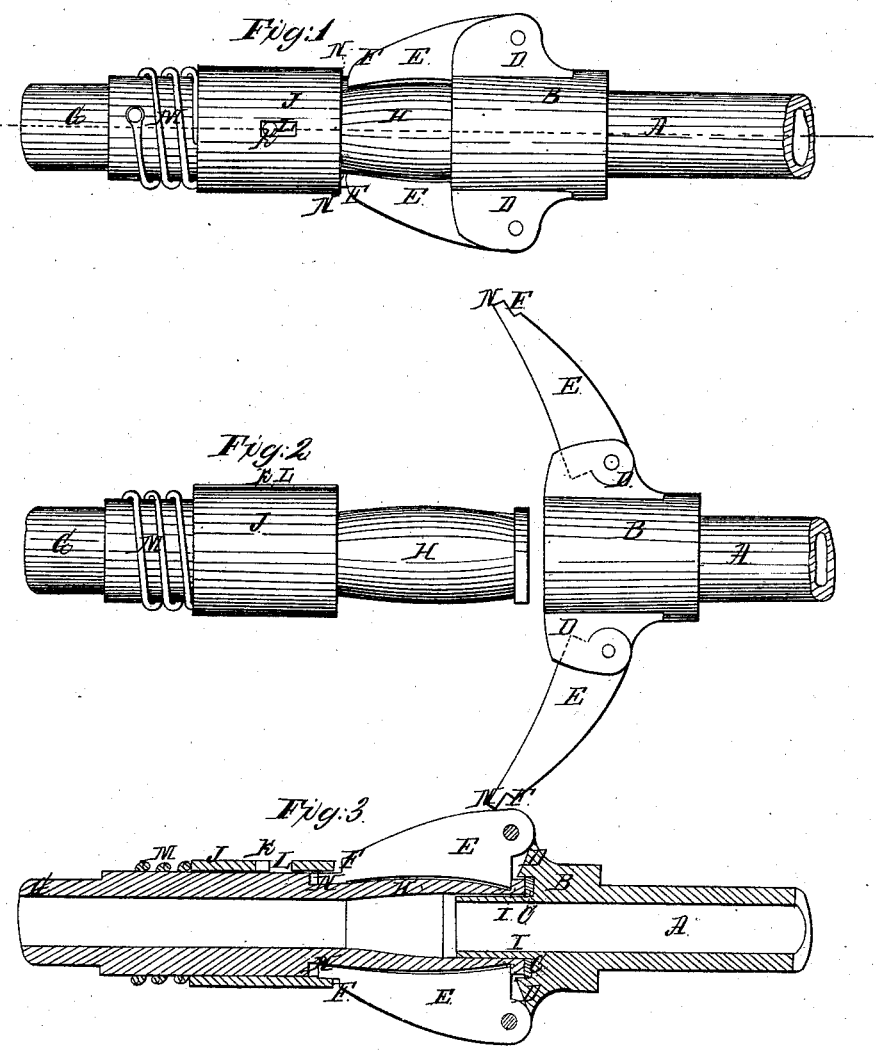

LOREN B. FORESTER, OF CLYDE, MICHIGAN.

Letters Patent No. 80,820, dated August 11, 1868.

IMPROVEMENT IN HOSE-COUPLINGS.

The Schedule referred to in these Letters Patent and making part of the same.

TO WHOM IT MAY CONCERN:

Be it known that I, LOREN B. FORESTER, of Clyde, in the county of St. Clair, and State of Michigan, have invented a new and useful Improvement in Self-Packing Pipe and Hose-Coupling; and I do declare that the following is a true and accurate description thereof, reference being had to the accompanying drawings, and to the letters of reference marked thereon, and being a part of this specification.

Figure 1 is a perspective view of my invention in operation.

Figure 2 is a perspective view of the same disconnected.

Figure 3 is a sectional view of the same, showing the packing, and operation of the levers.

The same letters indicate like parts in each figure.

The nature of this invention consists in attaching a coupling, for joining two ends of pipe or hose together, that will be perfectly tight, and instantly disconnected when required; that will resist any reasonable strain, and whose packing will always be in order.

In order to accomplish this end, I rigidly fasten to the pipe A, a short and larger pipe, B, which leaves an annular space around the inner pipe A, which space is provided with suitable packing, C, of rubber, or other proper material. The outer pipe, B, is provided with suitable ears, D, to which are provided the dog-levers E, which are furnished with shoulders F, for the purposes hereinafter described. To the pipe G is also rigidly attached the coupling-pipe H, provided with a shoulder, I. This pipe H should accurately fit the outside circumference of the pipes A and G, to the latter of which it is fastened. Upon the pipe H is loosely sleeved the ring J, and is held in place by a proper pin, K, which is attached to the pipe H, and works in a suitable slot, L, in the ring J. The spiral spring M, obtaining resistance by being attached to the pipe H, is designed to compel the ring J to engage with the catches N upon the ends of the dog-levers E, and hold the same in position, as shown in fig. 1.

To couple two pieces of pipe or hose, provided with my apparatus, the dog-levers E being thrown back, as in fig. 2, enter the coupling-pipe H into the pipe B, and round the pipe A, until the shoulder I comes into contact with the packing C. Then swing the dog-levers E into a parallel position relative to the coupling-pipe H, and slip the ring J over the catches N, where it is held in position by the spring M. To uncouple, slip the ring J back, freeing the catches N, when the shoulders F, which are engaged with the shoulder I, will be disengaged, and the various lengths of pipe or hose removed.

What I desire to secure by Letters Patent, as my invention, is—

The pipe B, attached to and surrounding the pipe A, the packing C, the ears D, the dog-levers E, provided with shoulders F, and catches N, to form that part of my coupling attached to the pipe A, when operating substantially as and for the purposes herein described.

Also the coupling-pipe H, provided with shoulder I, ring J, pin K, slot L, spring M, in connection with pipe G, when constructed and operating to form the other part of my coupling.

Also the combination and arrangement of all the above-named parts to form the two parts of a coupling, when constructed and operating substantially as and for the purposes herein set forth.

L. B. FORESTER.

Witnesses:
GEORGE RICHLANDT,
H. F. EBERTS.